US008519585B2

(12) United States Patent
Qin et al.

(10) Patent No.: US 8,519,585 B2
(45) Date of Patent: Aug. 27, 2013

(54) ENGINE COOLING SYSTEM AND FAN MODULE WITH DUST SCREEN

(75) Inventors: Rui Feng Qin, Hong Kong (CN); Xin Hui Guan, Shenzhen (CN)

(73) Assignee: Johnson Electric S.A., Murten (CH)

(*) Notice: Subject to any disclaimer, the term of this patent is extended or adjusted under 35 U.S.C. 154(b) by 198 days.

(21) Appl. No.: 13/084,966

(22) Filed: Apr. 12, 2011

(65) Prior Publication Data
US 2011/0253078 A1 Oct. 20, 2011

(30) Foreign Application Priority Data

Apr. 14, 2010 (CN) .......................... 2010 1 0155317

(51) Int. Cl.
*H02K 9/00* (2006.01)
*H02K 5/10* (2006.01)

(52) U.S. Cl.
USPC .............................. 310/88; 310/58; 123/41.49

(58) Field of Classification Search
USPC ................. 417/354, 366, 423.9; 310/58, 88; 55/301; 123/41.49; 415/121.2
See application file for complete search history.

(56) References Cited

U.S. PATENT DOCUMENTS

| | | | | |
|---|---|---|---|---|
| 1,476,776 A | * | 12/1923 | Stamm et al. | 417/350 |
| 5,236,306 A | * | 8/1993 | Hozak | 416/93 R |
| 5,494,006 A | * | 2/1996 | Davis, Jr. | 123/41.49 |
| 5,573,563 A | * | 11/1996 | Odom et al. | 55/301 |
| 5,610,456 A | * | 3/1997 | Wille et al. | 310/58 |
| 6,315,525 B1 | * | 11/2001 | Webb | 417/313 |
| 6,765,341 B2 | * | 7/2004 | Bae | 313/231.31 |
| 2005/0013711 A1 | * | 1/2005 | Goyetche | 417/423.9 |
| 2005/0074332 A1 | * | 4/2005 | Adamski et al. | 415/211.1 |
| 2006/0103245 A1 | * | 5/2006 | Simofi-Ilyes et al. | 310/58 |

FOREIGN PATENT DOCUMENTS

| | | |
|---|---|---|
| CN | 2657268 Y | 11/2004 |
| DE | 3546394 A1 * | 7/1987 |
| GB | 2215452 A * | 9/1989 |
| JP | 59191470 A | 10/1984 |
| JP | 59191470 A * | 10/1984 |
| JP | 5292723 | 11/1993 |
| JP | 5328687 | 12/1993 |
| JP | 2007318868 A | 12/2007 |

OTHER PUBLICATIONS

Machine translation of DE3546394A dated Jul. 2, 1987.*
English Abstract of JP59191470A dated Oct. 30, 1984.*
McNichols (http://web.archive.org/web/20100107005021/http://www.mcnichols.com/ecommerce/eos/stocklist?execution=e2s1&navCode=cc:perf#none, archive dated Jan. 7, 2010.*

* cited by examiner

*Primary Examiner* — Devon Kramer
*Assistant Examiner* — Nathan Zollinger
(74) *Attorney, Agent, or Firm* — Muncy, Geissler, Olds & Lowe, PLLC

(57) ABSTRACT

An engine cooling system incorporates a cooling fan module having a motor and a fan driven by the motor. The motor has a motor housing and two end caps disposed at respective ends of the motor housing. Each of the end caps has at least one axial hole to allow air to flow through the motor to dissipate heat from inside the motor. The motor also has a dust screen disposed inside the motor and adjacent each of the axial holes for preventing external particles entering the motor through the axial hole. Each dust screen has a plurality of apertures to allow air to flow through the motor but prevents dust particles entering the motor.

8 Claims, 4 Drawing Sheets

ENGINE COOLING SYSTEM AND FAN MODULE WITH DUST SCREEN

CROSS REFERENCE TO RELATED APPLICATIONS

This non-provisional patent application claims priority under 35 U.S.C. §119(a) from Patent Application No. 201010155317.4 filed in The People's Republic of China on Apr. 14, 2010.

STATOR OF THE INVENTION

The present invention relates to an engine cooling system and in particular to an cooling fan module for an engine.

BACKGROUND OF THE INVENTION

Internal combustion engines require a cooling system. An exemplary engine cooling system comprises a radiator, a pump and circulation pipes for transferring heat from the engine to the radiator, and a cooling fan module to dissipate the heat from the radiator.

The cooling fan module comprises a fan and a motor for driving the fan. The motor is usually a DC brush motor, comprising a motor housing having at least one opening and an end cap to close the opening. In a traditional cooling fan module motor, the motor is sealed without any apertures for allowing air to flow through the interior of the motor. The motor, particularly the interior of the motor, is prone to over heating and thus the life span of the motor as well as the engine cooling system may be reduced. To overcome this the motor must be much larger than otherwise required just to ensure sufficient thermal mass to handle normal operating conditions.

In an improved engine cooling system, the motor has at least one large aperture to allow air to flow into and out of the motor to dissipate the heat inside the motor. However, external particles such as dust particles, will enter motor through the apertures and accumulate inside the motor. The life span of the motor is also reduced due to the particles. This is a particular concern for vehicles that may be required to operate in dusty conditions such as 'off road' or in areas that are subject to dust storms.

Hence, there is a desire for an engine cooling system, which incorporates a motor that is dust-proof and capable of dissipating heat quickly.

SUMMARY OF THE INVENTION

Accordingly, in one aspect thereof, the present invention provides a cooling fan module, comprising a motor and a fan driven by the motor, the motor comprising a motor housing having a first hole for allowing air to enter the motor housing and a second hole for allowing air to exit the motor housing, the motor further comprises a dust screen arranged to cover the first hole, wherein the dust screen comprises a plurality of apertures for allowing air to flow through the dust screen and into the motor and for restricting external particles to enter the motor through the first hole.

Preferably, the motor housing comprises first and second end caps, the first end cap having the first hole and the second end cap having the second hole and the dust screen is disposed on an inner surface of the first end cap.

Preferably, the motor comprises two dust screens that are disposed inside the motor and respectively covering the first and second holes.

Preferably, the diameter of the apertures is less than 1 mm.

Preferably, the dust screen is made of a steel sheet and the apertures are formed by punching.

Alternatively, the dust screen is made from a mesh of woven steel wires.

Preferably, the module also comprises a support member, the support member comprising an outer frame, an inner mounting portion and connecting portions that connect the inner mounting portion to the outer frame, the motor being fixed to the inner mounting portion.

Preferably, mounting holes are formed in the mounting portion, and corresponding mounting holes are formed in the motor housing.

Preferably, the motor is a DC brush motor comprising brush gear located adjacent to an end cap of the motor and the dust screen is mounted to said end cap.

According to a second aspect, the present invention provides an engine cooling system comprising a radiator, a pump and circulation pipes for transferring heat from an engine to the radiator, and a cooling fan module as described above.

By implementing the invention, the motor of a cooling fan module has holes formed in the motor housing to cool the motor, and dust screens with small apertures are mounted inside the motor and cover the holes in the motor housing to prevent external particles entering the motor.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
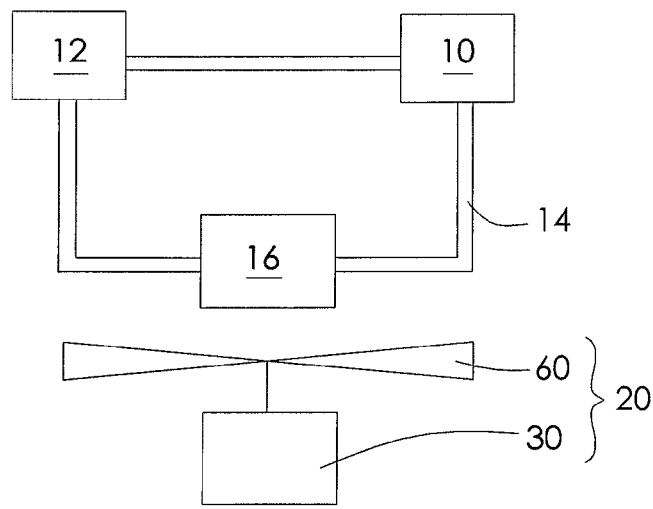
FIG. 1 schematically illustrates an engine cooling system according to a first embodiment of the present invention.

As shown in FIG. 1, the engine cooling system according to the first embodiment comprises a radiator 16, a pump 12 and circulation pipes 14 for transferring heat from an engine 10 to the radiator 16, and a cooling fan module 20 for cooling the radiator. The engine cooling system may be used for cooling an internal combustion engine of a vehicle. The heat is transferred using water as the heat transfer medium and the water is circulated between the engine and the radiator through the circulating pipes by the pump.

As shown in FIG. 2 to FIG. 6, the cooling fan module 20 comprises a motor 30 and a fan 60 fixed to a shaft of the motor 30. The motor 30 comprises a motor housing having two end caps 32, 34 that form respective ends of the motor housing.

The end cap 32 comprises axial holes 322, and the end cap 34 comprises axial holes 342. The motor 30 further comprises at least one dust screen 50 that is disposed inside the motor 30 and adjacent the corresponding end cap. The dust screen 50 covers the axial holes and is used to prevent external particles such as dust from entering the motor 30 through the axial holes 322 and/or 342. The dust screen 50 comprises a plurality of apertures 52 so that air flow can come into the motor 30 from one of the end caps 32, 34 and come out of the motor 30 through the other end cap. The apertures 52 formed in the dust screen 50 are sized to prevent or to restrict the entry of dust particles into the motor.

In this preferred embodiment, the motor 30 comprises two dust screens 50 that are disposed inside the motor 30 and on or near the end caps 32 and 34 respectively. The diameter of each aperture 52 is less than 1 mm. Preferably the diameter of each aperture 52 is less than 0.85 mm, so that air can flow into the motor 30 to cool the motor 30 while the particles having a diameter larger than 0.85 mm cannot enter the motor 30. When a vehicle equipped with such a cooling fan module is driven in dusty conditions such as in a dust storm, the cooling fan module 20 and the motor 30 are able to function normally.

A person skilled in the art would appreciate that the apertures could have various shapes, such as circular holes, square holes and oval holes. For the non-circular aperture 52, the diameter of the aperture 52 is defined by the diameter of an inscribed circle of the aperture 52.

In this embodiment, the dust screen 50 is annular and made from a steel sheet. The apertures 52 are formed by a punching technique. Mounting holes 54 are formed at positions near the edge of the dust screen 50, for fixing the dust screen to the inside of the end caps 32 and 34 by bolts or screws. A person skilled in the art will understand that the dust screen 50 can be fixed by other means such as soldering, welding, snapping, etc. and may be fixed to the outside of the end caps.

Figure 7:
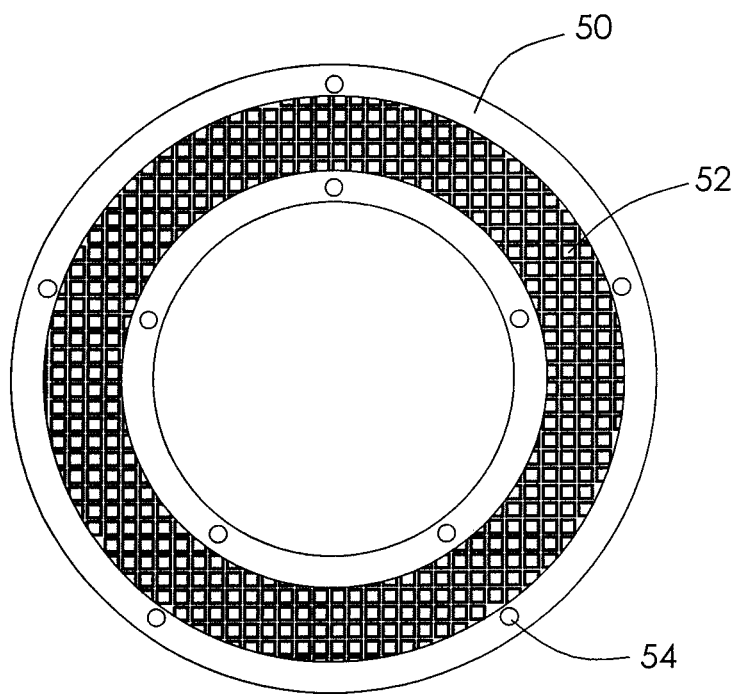
FIG. 7 illustrates a dust screen according to a second embodiment of the present invention.

As shown in FIG. 7, the dust screen 50, according to a second embodiment is made from a steel mesh, formed for example by weaving steel wires. The dust screen 50 is in ring shape, and both inner edge and outer edge are covered by corresponding bindings. Mounting holes 54 are formed in the bindings for fixing the screen to the end cap.

Preferably, the motor 30 is a DC brush motor, comprising brush gear, a stator and a rotor. The rotor comprises a shaft 36 which extends out of the motor housing through the front end cap 32 and into the mounting hole 62 of the fan 60. When only one dust screen 50 is used, the dust screen 50 is preferably mounted on the back end cap 34 to prevent the external particles such as dust from flowing into the motor. Preferably, the brush gear is located adjacent the back end cap. Alternatively, the motor 30 has two dust screens 50 which are mounted on respective end caps to filter the air entering the motor housing.

Figure 2:
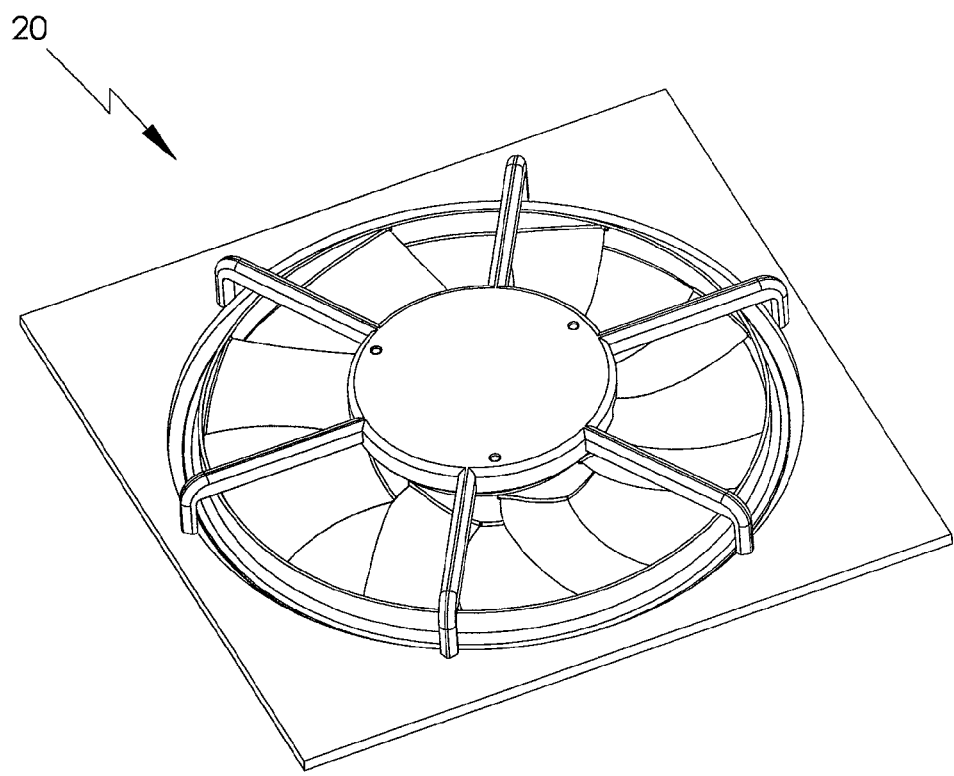
FIG. 2 illustrates an cooling fan module being a part of the engine cooling system of FIG. 1.
Figure 3:
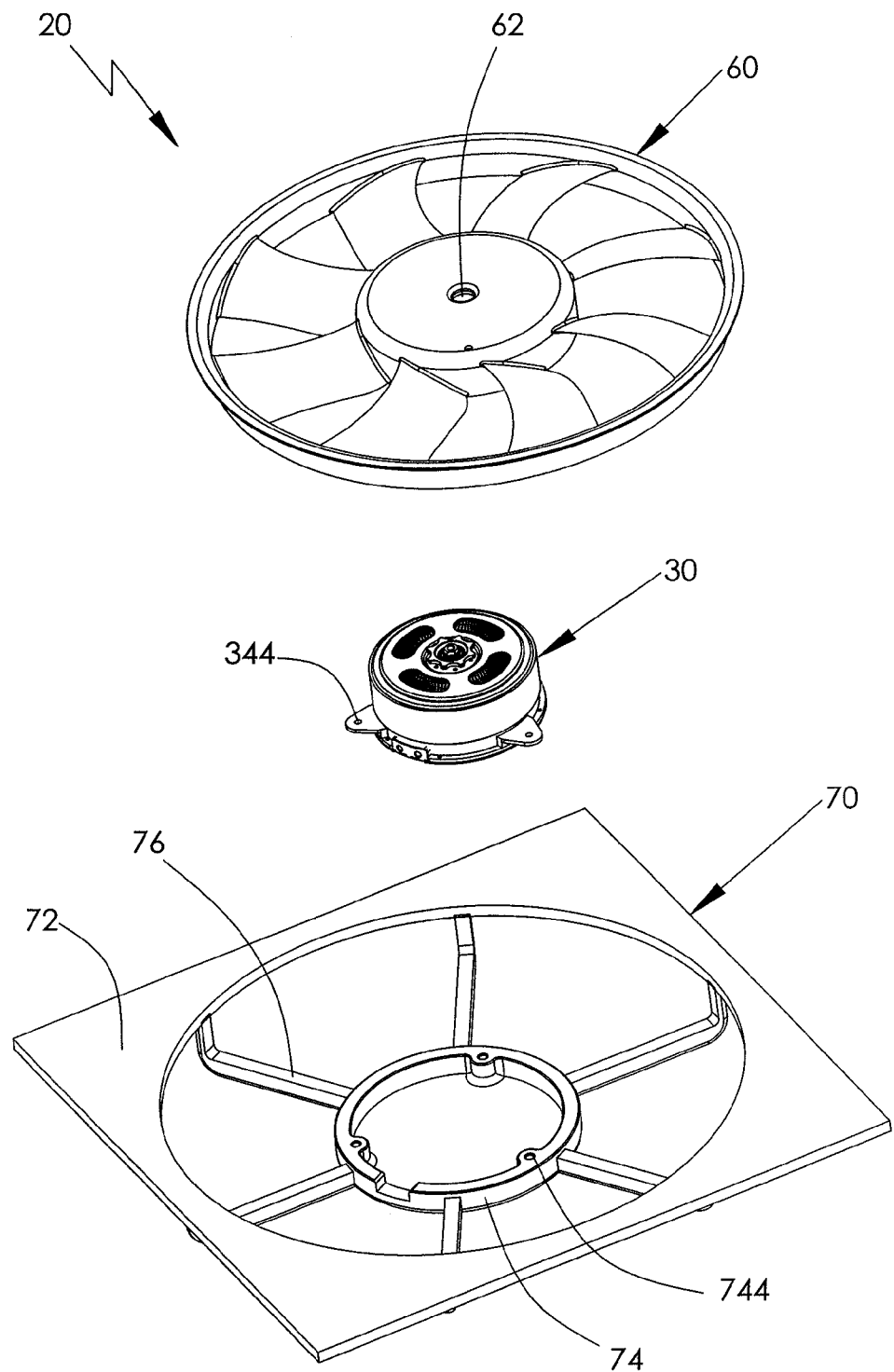
FIG. 3 is an exploded view of the cooling fan module of FIG. 2.
Figure 4:
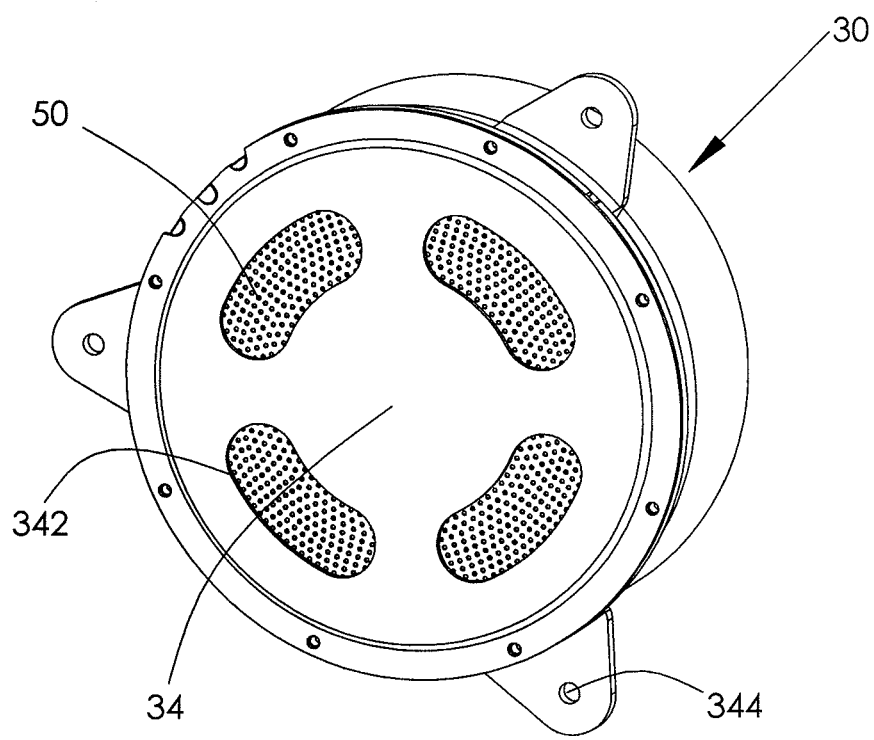
FIG. 4 illustrates a motor of the cooling fan module of FIG. 2.
Figure 5:
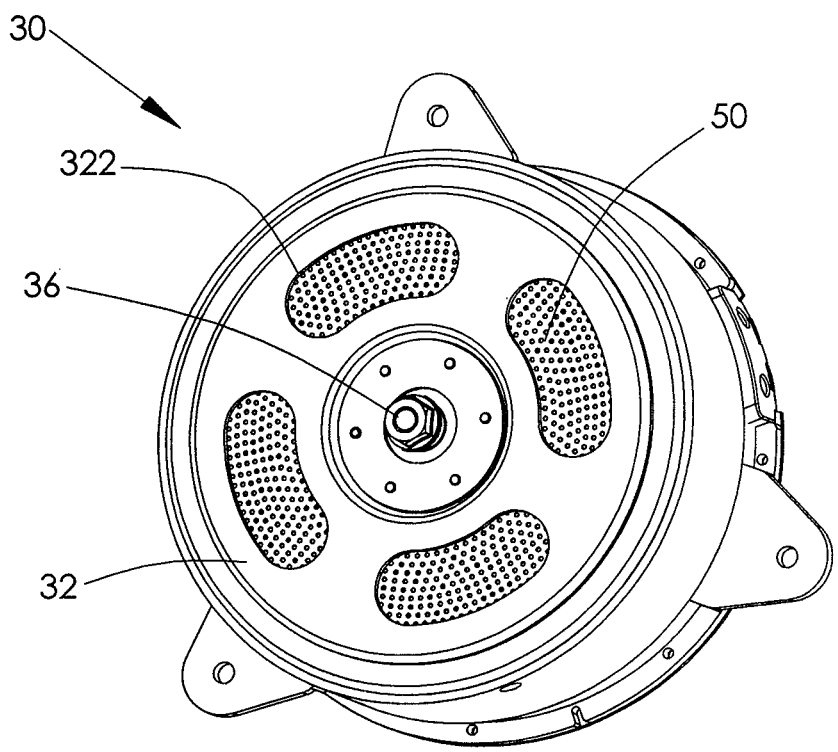
FIG. 5 is another view of the motor of FIG. 4.
Figure 6:
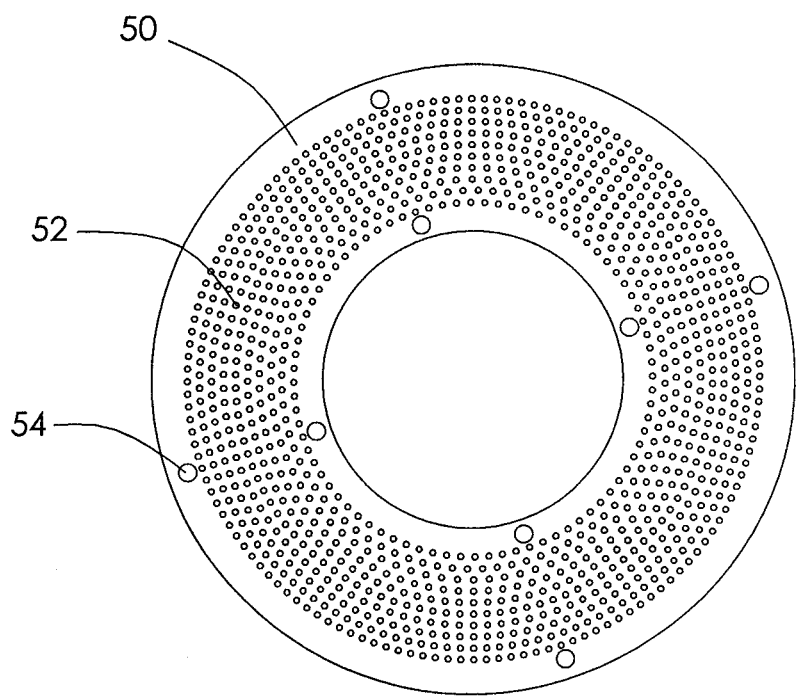
FIG. 6 illustrates a dust screen used in the motor of FIG. 4.

As shown in FIGS. 2 and 3, the cooling fan module 20 further comprises a support member 70. The support member 70 comprises an outer frame 72, an inner ring-shaped mounting portion 74 and a plurality of radial connecting portions 76 that connect the outer frame 72 to the inner mounting portion 74. Mounting holes 744 are formed in the mounting portion 74, and mounting holes 344 are formed in the motor housing, preferably on the back end cap 34 of the motor 30. The motor 30 is fixed to the mounting portion 74 by screws or rivets that pass through the mounting holes 344 and 744. The fan 60 is fixed to the motor shaft 36 and then the cooling fan module 20 is mounted at a position on or near to the radiator 16 by the outer frame 70.

Embodiments of the invention include a motor that is cooled by an air flow generated by the motor 30 and flows into the motor through the back end cap 34 and out of the motor through the front end cap 32. External particles such as dust are restricted from entering the motor 30.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, while the preferred motor has two end caps, the invention may be applied to motors with only one end cap. While the holes for the flow of air into and out of the motor are described as axial holes in the two end caps, the holes may be provided at other locations in the motor housing. While not otherwise mentioned, a rotor fan may be disposed inside the motor housing to generate the flow of air through the motor.

The invention claimed is:

1. A cooling fan module, comprising a motor and a fan driven by the motor, the motor comprising a motor housing having first and second end caps, the first end cap having a plurality of first holes for allowing air to enter the motor housing, the second end cap having a plurality of second holes for allowing air to exit the motor housing,
   the motor further comprises two dust screens respectively covering the first and second holes,
   wherein each dust screen comprises a plurality of apertures for allowing air to flow through the motor and for restricting external particles to enter the motor through the first holes; the fan is arranged outside the motor housing; each dust screen is in a ring shape, the inner edge and outer edge of each dust screen are provided with corresponding bindings that are fixed to the motor housing.

2. The cooling fan module of claim 1, wherein the dust screens are respectively disposed on inner surfaces of the first and the second end caps.

3. The cooling fan module of claim 1, wherein the diameter of the apertures is less than 1 mm.

4. The cooling fan module of claim 1, wherein each dust screen is made of a steel sheet and the apertures are formed by punching.

5. The cooling fan module of claim 1, wherein each dust screen is made from a mesh of woven steel wires.

6. The cooling fan module of claim 1, further comprising a support member, the support member comprising an outer frame, an inner mounting portion and connecting portions that connect the inner mounting portion to the outer frame, the motor being fixed to the inner mounting portion.

7. The cooling fan module of claim 6, wherein mounting holes are formed in the mounting portion, and corresponding mounting holes are formed in the motor housing.

8. An engine cooling system, comprising: a radiator, a pump and circulation pipes for transferring heat from an engine to the radiator, and the cooling fan module of claim 1 for cooling the radiator.

* * * * *